US009473767B1

(12) United States Patent
Maz

(10) Patent No.: US 9,473,767 B1
(45) Date of Patent: Oct. 18, 2016

(54) MULTIFACTOR EYE POSITION IDENTIFICATION IN A DISPLAY SYSTEM

(71) Applicant: CAE Inc., Saint-Laurent (CA)

(72) Inventor: Emmanuel Maz, Montreal (CA)

(73) Assignee: CAE INC., Saint-Laurent (CA)

( * ) Notice: Subject to any disclaimer, the term of this patent is extended or adjusted under 35 U.S.C. 154(b) by 0 days.

(21) Appl. No.: 14/674,636

(22) Filed: Mar. 31, 2015

(51) Int. Cl.
*H04N 13/04* (2006.01)
*H04N 13/00* (2006.01)
*H04N 5/14* (2006.01)

(52) U.S. Cl.
CPC .......... *H04N 13/0484* (2013.01); *H04N 5/145* (2013.01); *H04N 13/0022* (2013.01)

(58) Field of Classification Search
CPC ............ G09B 9/02; G09B 9/32; G09B 5/06; G09B 7/00; G09B 7/04; G09B 9/00; G09B 9/302; G09B 9/307; G09B 9/326; A63F 13/06; A63F 13/10; A63F 13/12; A63F 2300/1093; A63F 2300/308; A63F 2300/5593
USPC .......................................................... 348/51
See application file for complete search history.

(56) References Cited

U.S. PATENT DOCUMENTS

| 5,137,450 | A | 8/1992 | Thomas |
| 5,224,861 | A | 7/1993 | Glass et al. |
| 5,240,207 | A | 8/1993 | Eiband |
| 5,275,565 | A | 1/1994 | Moncrief |
| H1728 | H | 5/1998 | Kelso et al. |
| 5,748,867 | A | 5/1998 | Cosman et al. |
| 6,163,336 | A | 12/2000 | Richards |
| 6,196,845 | B1 | 3/2001 | Streid |

(Continued)

FOREIGN PATENT DOCUMENTS

| CN | 101251959 | 8/2008 |
| CN | 104269083 | 1/2015 |
| KR | 101191556 | 10/2012 |

OTHER PUBLICATIONS

Dörr et al, "Virtual Cockpit Simulation for Pilot Training", Institute for Flight Mechanics and Control, Technical University Darmstadt, Germany, presented at RTO HFM Workshop on 'What is Essential for Virtual Reality Systems to Meet Military Human Performance Goals?', Apr. 13-15, 2000, pp. 11-1 to 11-7, published in RTO MP-058.

(Continued)

*Primary Examiner* — Jessica M Prince
(74) *Attorney, Agent, or Firm* — Gowling WLG LLP; Benoit Yelle

(57) ABSTRACT

A display system comprising a display screen for displaying a stream of images, a viewer positioning module and an image generator module. The viewer positioning module is for determining a viewer's sightline by defining a first factor of the sightline as a lateral position of a viewer's body part located between the viewer's chin and the viewer's waistline, defining a second factor of the sightline as a depth position of the body part and computing the sightline based at least on the first factor and the second factor. The image generator module is for generating the stream of images considering the determined sightline. A method comprising defining the first factor, defining the second factor, computing the sightline based at least on the first factor and the second factor, generating the stream of images considering the determined sightline and displaying the stream of images on a first display screen.

12 Claims, 3 Drawing Sheets

(56) References Cited

U.S. PATENT DOCUMENTS

| | | |
|---|---|---|
| 6,232,932 B1 | 5/2001 | Thorner |
| 6,281,651 B1 | 8/2001 | Haanpaa |
| 6,459,446 B1 | 10/2002 | Harman |
| 6,826,523 B1 | 11/2004 | Guy et al. |
| 7,117,135 B2 | 10/2006 | Cull et al. |
| 7,825,996 B2 | 11/2010 | Yamada et al. |
| 8,488,243 B2 | 7/2013 | McKnight et al. |
| 8,564,622 B1 | 10/2013 | Quinn et al. |
| 2002/0075210 A1 | 6/2002 | Nestrovic et al. |
| 2003/0067536 A1* | 4/2003 | Boulanger ............... H04N 7/15 348/14.08 |
| 2004/0104935 A1 | 6/2004 | Williamson |
| 2004/0155186 A1 | 8/2004 | Nestrovic et al. |
| 2006/0081793 A1 | 4/2006 | Nestrovic et al. |
| 2006/0114171 A1 | 6/2006 | Vascotto et al. |
| 2006/0251338 A1* | 11/2006 | Gokturk ............ G06F 17/30253 382/305 |
| 2007/0088467 A1 | 4/2007 | Knotts |
| 2007/0202470 A1 | 8/2007 | Petruziello |
| 2007/0225118 A1 | 9/2007 | Giorno |
| 2008/0070196 A1 | 3/2008 | Luty |
| 2008/0206720 A1 | 8/2008 | Nelson |
| 2008/0217472 A1 | 9/2008 | Diamandis |
| 2009/0098981 A1 | 4/2009 | Del Giorno |
| 2009/0292178 A1 | 11/2009 | Ellis |
| 2010/0182409 A1 | 7/2010 | Suzuki |
| 2010/0266992 A1 | 10/2010 | Gregoire |
| 2011/0027761 A1 | 2/2011 | Nunez |
| 2011/0074770 A1* | 3/2011 | Robinson ................ G06T 15/20 345/419 |
| 2011/0098109 A1 | 4/2011 | Leake |
| 2011/0183301 A1 | 7/2011 | Turner |
| 2012/0032952 A1* | 2/2012 | Lee .................... H04N 13/0477 345/419 |
| 2012/0251995 A1 | 10/2012 | Ghyme |
| 2013/0101968 A1 | 4/2013 | Grabenstetter |
| 2013/0268205 A1 | 10/2013 | Aragones |
| 2014/0002619 A1* | 1/2014 | Morohoshi ........ H04N 21/4223 348/51 |
| 2014/0080099 A1 | 3/2014 | Sowadski |
| 2014/0186810 A1* | 7/2014 | Falash ..................... G09B 7/00 434/308 |
| 2014/0248588 A1 | 9/2014 | Williams |
| 2014/0295970 A1* | 10/2014 | Gronkowski ...... G07F 17/3206 463/32 |
| 2014/0322674 A1 | 10/2014 | Livneh |
| 2015/0049176 A1* | 2/2015 | Hinnen ................ H04N 13/007 348/59 |
| 2015/0050623 A1 | 2/2015 | Falash |
| 2015/0079545 A1 | 3/2015 | Kurtz |
| 2015/0145704 A1 | 5/2015 | Dahan |
| 2015/0269860 A1 | 9/2015 | Shaw |

OTHER PUBLICATIONS

"Desk Pilot v1.4.2 Shared Cockpit Crew Manual", Harders M., Jun. 30, 2013.

"Flight Simulator First Officer Manual", King M., Aug. 12, 2012.

* cited by examiner

MULTIFACTOR EYE POSITION IDENTIFICATION IN A DISPLAY SYSTEM

PRIORITY STATEMENT

This non-provisional patent application claims priority based upon the PCT patent applications entitled "MULTIFACTOR EYE POSITION IDENTIFICATION IN A DISPLAY SYSTEM", filed on even date herewith, in the name of CAE Inc., the PCT application being incorporated by reference in its entirety.

TECHNICAL FIELD

The present invention relates to computer generated images and, more particularly, to using a computer to generate images on a screen.

BACKGROUND

In computer simulation, an important aspect is to credibly replicate an actual environment, which facilitates and helps maintaining immersion. In order to remain credible, the image generation in the computer simulation has to take visual effects into account, such as the parallax effect. The image generation must also appear fluid from the user's point of view. One way to replicate the parallax effect is to use a collimated display. Collimated displays are expensive. They also cannot be used in smaller simulators because they require a large mirror. The parallax effect can be simulated on a simple projection screen based on position of the user's eyes. However, simulating the parallax effect in this way results in a jittery and unrealistic image.

The present invention aims at improving the fluidity of the image generation when simulating the parallax effect based on the position of the user's eyes.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of a first set of embodiments in accordance with the present invention is directed to a display system comprising a display screen for displaying a stream of images, a viewer positioning module and an image generator module. The viewer positioning module is for determining a viewer's sightline by defining a first factor of the sightline as a lateral position in the display system of a viewer's body part located between the viewer's chin and the viewer's waistline, defining a second factor of the sightline as a depth position in the display system of the body part; and computing the sightline based at least on the first factor and the second factor. The image generator module is for generating the stream of images considering the determined sightline.

The image generator module may further be for generating the stream of images and a second stream of images thereby forming a stream of stereoscopic images. The viewer positioning module may further be for defining a third factor of the sightline as a viewer's eye-level height and horizontal rotational attitude, wherein computing the sightline is further based on the first factor, the second factor and the third factor for ensuring correct generation of the stream of stereoscopic images. The viewer's eye-level height may be calculated by applying a translation value to the position of the body part.

The viewer positioning module may compute the sightline by dynamically determining the lateral position of the body part corresponding to the first factor and combining the lateral position with a static viewer's expected depth position of the viewer in the display system corresponding to the second factor.

The viewer positioning module may compute the sightline by dynamically determining the lateral position of the body part corresponding to the first factor and the depth position of the body part corresponding to the second factor in the display system.

The viewer positioning module may define the third factor of the sightline by dynamically determining the expected eye-level height.

The viewer positioning module, once the body part is determined to be moving, may define at least one of the first factor and the second factor of the sightline further using a predictive relative position factor of the body part.

The viewer positioning module may obtain at least one of the first factor and second factor for the position of the viewer's body part by image recognition matching an expected outfit with a viewer's actual outfit.

The viewer positioning module may obtain at least one of the first factor and second factor for the position of the viewer's body part by determining a reflector position of an infra-red or near-infra-red reflector on the body part.

The viewer positioning module may obtain at least one of the first factor and second factor for the position of the viewer's body part by determining a tracker position of a magnetic tracker on the body part.

The viewer positioning module may obtain at least one of the first factor and second factor for the position of the viewer's body part by using ultrasonic reflections.

The viewer positioning module may obtain at least one of the first factor and second factor for the position of the viewer's body part by determining a relative position between a seat of the display system and the body part. The seat may provide an array of position detector for determining the relative position.

The viewer positioning module may obtain at least one of the first factor and second factor for the position of the viewer's body part by determining a wearable device position of a wearable element of the display system worn on the body part.

The image generator module may further load a simulation model from at least one simulation database for generating the stream of images and the display system may further comprise an instrument module for providing at least one physical interface element to the viewer of the display system and a simulation engine module for managing a computer simulation in the display system, the simulation engine module computing the simulation model from inputs obtained from the instrument module and a plurality of simulation parameters of the computer simulation.

A second aspect of the first set of embodiments in accordance with the present invention is directed to a method for displaying a stream of images. The method comprises defining a first factor of a viewer's sightline as a lateral position in a display system of a viewer's body part located between a viewer's chin and a viewer's waistline, defining a second factor of the sightline as a depth position in the display system of the body part, computing the sightline based at least on the first factor and the second factor, generating the stream of images considering the determined sightline and displaying the stream of images on a first display screen.

Generating the stream of images may further comprise generating a second stream of images thereby forming a stream of stereoscopic images. The method may then further comprise defining a third factor of the sightline as a viewer's eye-level height and horizontal rotational attitude. Computing the sightline may thus be further based on the first factor, the second factor and the third factor for ensuring correct generation of the stream of stereoscopic images.

Computing the sightline may comprise dynamically determining the lateral position of the body part corresponding to the first factor and combining the lateral position with a static viewer's expected depth position of the viewer in the display system corresponding to the second factor or dynamically determining the lateral position of the body part corresponding to the first factor and the depth position of the body part corresponding to the second factor in the display system.

The method may further comprise, once the body part is determined to be moving, defining at least one of the first factor and the second factor of the sightline further using a predictive relative position factor of the body part.

At least one of the first factor and second factor for the position of the viewer's body part is defined by image recognition matching an expected outfit with a viewer's actual outfit; determining a reflector position of an infra-red or near-infra-red reflector on the body part, determining a tracker position of a magnetic tracker on the body part, using ultrasonic reflections, determining a relative position between a seat of the display system and the body part or determining a wearable device position of a wearable element of the display system worn on the body part.

The method may further comprise loading a simulation model from at least one simulation database for generating the stream of images, providing at least one physical interface element to the viewer of the display system and managing a computer simulation in the display system by computing the simulation model from inputs obtained from the instrument module and a plurality of simulation parameters of the computer simulation.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
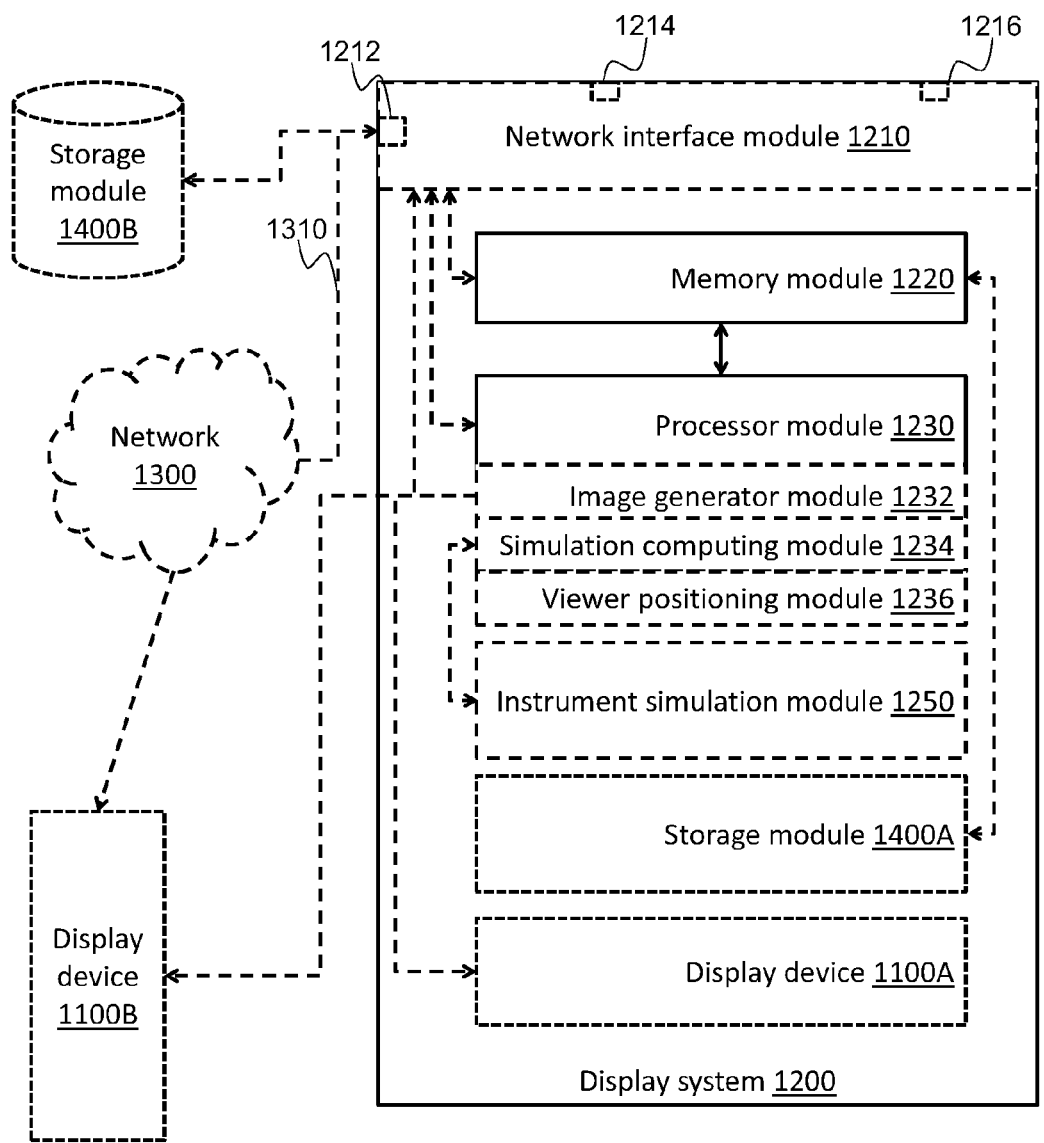
FIG. 1 is a modular representation of an exemplary display system in accordance with the teachings of the present invention.

Reference is now made to the drawings in which FIG. 1 shows a logical representation of an exemplary display system 1200 in accordance with the teachings of the present invention. FIG. 1 also shows a logical representation of an optional network 1300 that may be used in certain embodiments of the present invention. The display system 1200 comprises a memory module 1220 and a processor module 1230. A display device is provided with the display system 1100A and/or in communication with the display system 1100B (both solutions being referred to as 1100). The display device 1100 may comprise at least one physical display unit, and may also comprise many display units of one or more technologies (e.g., Cathode Ray Tube (CRT), Liquid Crystal Display (LCD) screen or projector, any means to project the image onto a screen, mirror and/or display surface, superimposed display in glasses, virtual reality, retinal scanners, etc.). A storage module is provided with the display system 1400A and/or in communication with the display system 1400B (both solutions being referred to in the description as 1400). The storage devices module 1400A and/or 1400B may represent one or more logical or physical as well as local or remote hard disk drive (HDD) (or an array thereof). The storage devices module 1400 may further represent a local or remote database made accessible to the display system 1200 by a standardized or proprietary interface. The display system 1200 may, in certain embodiments, comprise a network interface module 1210 and an instrument simulation module 1250. The processor module may further comprise, or may be seen logically as comprising, an image generator module 1232, a simulation computing module 1234, and a viewer positioning module. The image generator module 1232 may also comprise one or more dedicated graphical processing units. When considered together as a single unit, the display system 1200 and the image generator module 1232 are sometimes referred to as a visual system.

The network interface module 1210, e.g., through one or more of its interfaces (e.g., 1212, 1214, 1216), may be used in the context of the present invention to communicate through the network 1300 with the display device 1100B (e.g., display data over Ethernet) and/or with the storage module 1400B (e.g., to store and/or load a model of a computer simulation). The one or more interfaces may use different protocols and physical medium (e.g., local area network (LAN) over twisted pair cables, wireless LAN, wide area network (WAN) over cable, optical fiber, cellular, etc.), metropolitan area network MAN), etc.).

In accordance with a first set of embodiments, the display system 1200 displays a stream of images on the display device 1100 based on the sightline of the viewer. The sightline of the viewer generally refers to the information about the viewer's eye position in the display system 1200 required by the display system 1200 to generate the stream of images within expected realism limits. In some embodiments, the sightline represents the general position of the user in the display system 1200. In some other embodiments, the sightline is more specifically the line from the viewer's eyes to the display device 1100. Skilled person will readily understand what the sightline of the viewer represents in the different examples provided in the following description.

The display system 1200 is for displaying the stream of images. In the context of the illustrated example, the distance between the display device 1100 and the viewer may be shorter than is necessary for a collimated display. The display device 1100 comprises any means for projecting an image on a screen. The display system 1200 provides some means of correcting the geometry of the displayed objects in order to simulate or enhance the parallax effect.

Figure 3:
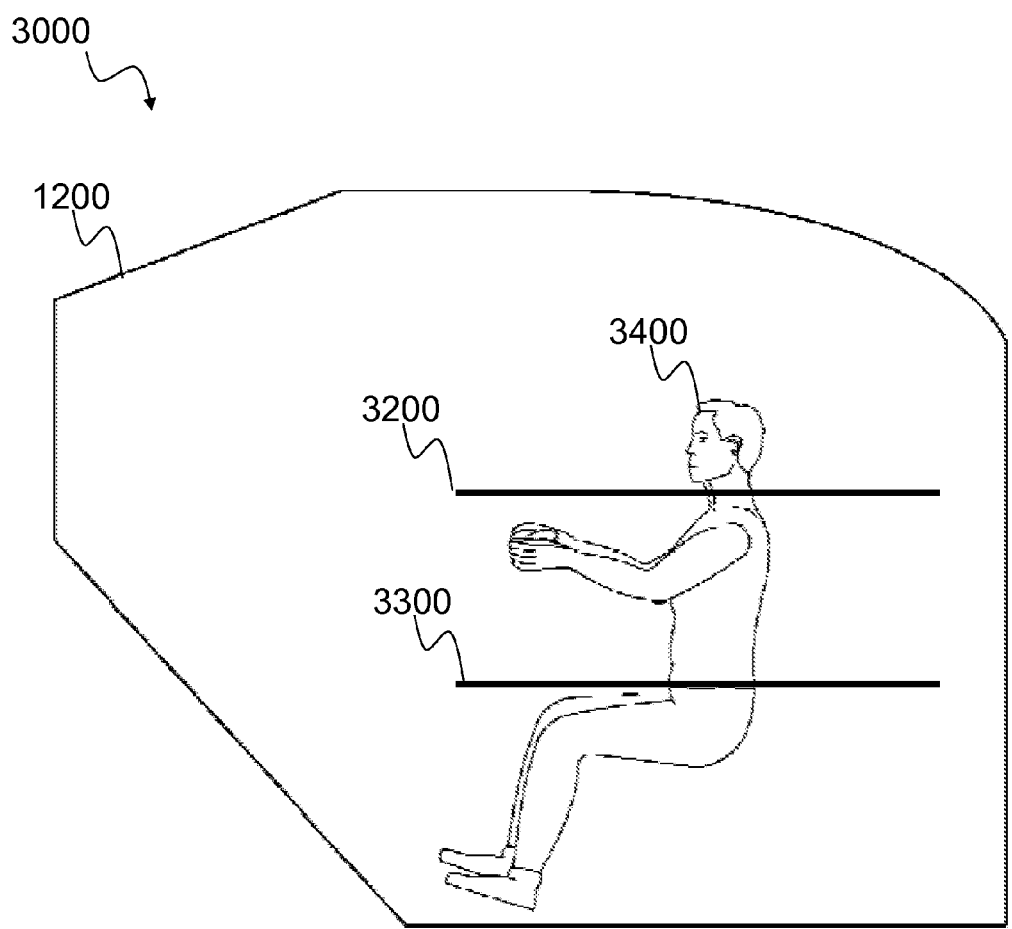
FIG. 3 is a logical representation of a user with the exemplary display system in accordance with the teachings of the present invention.

Reference is now concurrently made to FIGS. 1 and 3. FIG. 3 shows a viewer 3400 seated within an exemplary display system 1200. The viewer positioning module 1236 is for determining a viewer's sightline (or multiple sightlines for different viewers). A first factor of the sightline is defined as a lateral position in the display system 1200 of a viewer's body part located between the viewer's chin 3200 and the viewer's waistline 3300. A second factor of the sightline is defined as a depth position in the display system 1200 of the body part. The viewer's body part is preferably the viewer's chest, and close to the viewer's head, without losing the computational advantages provided by avoiding many and/or frequent movements of the head from consideration. Multiple body parts of the viewer may also be tracked (e.g., an average of the body parts positions being used to minimize the error and/or jitter) without affecting the present teachings. The sightline is computed based at least on the first factor and the second factor. The image generator module 1232 generates the stream of images for display on the display device 1100 based on the computed sightline. When the tracking point is on the viewer's head, the frequent changes in the rotational attitude of the viewer's head causes the image generator module 1232 to update frequently, which increases image jitter and decreases the user's perceived realism. To replicate or enhance the parallax effect, the depth and lateral position of the viewer's sightline may be used. By using a point on the body between the viewer's chin and waistline as the tracking point, the depth and lateral position of the viewer's are tracked sightline without necessarily tracking all the minute changes in the viewer's head position. This results in a fluid and more realistically perceived stream of images from the image generator module 1232. Preferably, the viewer is in the seated position. Alternatively, the user may be in motion or in the standing position, for example for gunnery training.

Persons skilled in the art will readily recognize that the invention in accordance with the first set of embodiments may also be applicable for more than one viewer in the display system 1200. More specifically, the viewer positioning module 1236 may also define a first factor of the sightline for each of the viewers (defined as a lateral position in the display system 1200 of each viewer's body part located between their chin and their waistline). A second factor of the sightline for each of the viewers may be defined as a depth position in the display system 1200. When more than one viewers are present in the display system 1200, the image generator module 1232 generates one stream of images (or one stream of stereoscopic images when 3D is used) for each of the viewers for display on the display device 1100 based on each of the computed sightlines. Display channels may be added in order to add more separate streams of images for additional users. However, as each new channel results in a reduction of image quality, a limit to the number of channels that may be added is reached when the perceived image quality is not sufficient for the purpose of the display system 1200. While it has been tested to have up to four channels without significant reduction in the image quality, it is expected that more channels could be added. Skilled persons will readily understand that the present invention in accordance with the first set of embodiments is not limited by the number of channels provided by the display system 1200.

In the context of the illustrated example, the image generator module 1232 may further be for generating the stream of images and a second stream of images thereby forming a stream of stereoscopic images. The viewer positioning module 1236 may further be for defining a third factor of the sightline as a viewer's eye-level horizontal rotational attitude, wherein computing the sightline is further based on the first factor, the second factor and the third factor for ensuring correct generation of the stream of stereoscopic images. To generate a realistic stream of stereoscopic images, the image generator module 1232 takes into consideration the viewer's eye-level horizontal rotational attitude. Since neither the first factor nor the second factor tracks the viewer's eye-level horizontal rotational attitude, a third factor is required.

The viewer positioning module 1236 may define the first factor of the sightline as the position of the body part by dynamically determining a lateral position of the body part and combining the lateral position with a static viewer's expected depth position of the viewer in the display system 1200. In the context of the first set of embodiments, the viewer may be seated in a seat such that the viewer's viewing depth from the display device 1100 will be more or less static throughout the viewing of the stream of images. Consequently, in some embodiments, it is unnecessary for the viewer positioning module 1236 to dynamically track the viewer's depth. The viewer positing module 1236 may simply dynamically track the viewer's lateral position. The image generator module 1232 may then use this dynamically determined lateral position along with the expected depth of the viewer. A skilled person will readily understand that the expected depth could be a static value stored in the storage module 1400 of the display system 1200. The expected depth could also be an input value that a user inputs into the display system 1200. The expected depth could also be calculated dynamically (e.g., at runtime) or statically (e.g., when the display system 1200 is initiated) based on a depth position of the viewer seat.

The viewer positioning module 1236 of the display system 1200 may also optionally define the first factor and the second factor of the sightline as the position of the body part by dynamically determining a lateral and a depth position of the body part in the display system 1200. In this case, the depth position of the body part may be determined dynamically in a similar manner to the lateral position of the body part.

The viewer positioning module 1236 may optionally be for defining a third factor of the sightline by dynamically determining the expected eye-level height. A skilled person will readily understand that it is possible to dynamically determine the eye-level height of the viewer using a facial recognition system. Once the eye-level height has been determined, the display system 1200 may calculate the third factor as the difference between the body part tracked by the first factor and second factor and the eye-level height. The second factor can then be used to calculate the sightline based on the dynamically tracked first factor and second factor. The eye-level height may only be measured once at the beginning of the simulation. It may not need to be continuously tracked throughout the simulation. Alternatively, the eye-level height or the difference between the tracked body part and the eye-level height could be an input to the display system 1200 by a user. As another alternative, the difference between the tracked body part and the eye-level height could be an expected difference based on a statistical average. This expected eye-level height could be stored on the storage module 1400.

Optionally, the viewer positioning module 1236, once the body part is determined to be moving, defines the first factor and second factor of the sightline further using a predictive relative position factor of the body part. A skilled person will readily recognize that it is possible to predict the movement of the body part tracked by the first factor and second factor once the body part tracked is in movement, e.g., using software. Predicting the movement of the body part in this way may improve the fluidity of the stream of images generated by the image generator module 1232.

The viewer positioning module 1236, may obtain the position of the viewer's body part by image recognition, matching an expected outfit with a viewer's actual outfit. For example, in the case of military and civil aircraft simulators, the pilots may wear their uniforms during the simulation. The viewer positioning module 1236 could obtain the position of the viewer's body part by tracking an expected piece of insignia on the viewer's uniform.

The viewer positioning module 1236 may optionally obtain the position of the viewer's body part by determining a reflector position of an infra-red or near-infra-red reflector on the body part. A skilled person will readily understand how to track the infra-red or near-infra-red reflector attached to the body part by emitting an infra-red or near-infra-red light and detecting the location of the reflection of that light.

The viewer positioning module 1236 may as another option obtain the position of the viewer's body part by determining a tracker position of a magnetic tracker on the body part. A skilled person will readily understand how to track the body part by detecting the location of the magnetic tracker.

The viewer positioning module 1236 may also obtain the position of the viewer's body part by using ultrasonic emitters. An array of ultrasonic emitters may be placed on the back of the seat or on the headrest of the seat to determine the position of the viewer relative to the seat. The viewer's sightline may then be determined based on the known or detected position of the seat.

As another optional alternative, the viewer positioning module 1236 may obtain the position of the viewer's body part by determining a relative position between a seat of the display system 1200 and the body part. The seat may provide an array of position detectors for determining the relative position. The viewer positioning module 1236 may calculate the position of the viewer's body part based on the known position of the seat and the determined relative position between the seat and the body part. The position of the seat could be statically stored on the storage module 1400. Furthermore and as an alternative, as the seat is moved, the position of the seat stored on the storage module 1400 could be dynamically updated. As another alternative, the position of the seat could be manually entered into the display system 1200 by a user. Optionally, the position of the seat could be dynamically detected.

The viewer positioning module 1236 could optionally obtain the position of the viewer's body part by determining a wearable device position of a wearable element of the display system 1200 worn on the body part. For example, in a vehicle simulation, the viewer may be wearing a seatbelt. The position of the viewer's body part could be determined by tracking a portion of the seatbelt (e.g., the buckle of the seatbelt) using image recognition software.

The viewer positioning module 1236 may optionally use more than one of the above tracking methods concurrently or sequentially. As skilled persons will readily understand, some tracking or detection methods work better under certain conditions (e.g., lighting condition, presence of background magnetic field and/or electromagnetic field, etc.). In certain situations, it may be possible to achieve a more accurate tracking the viewer's sightline by combining the results of multiple tracking methods. The viewer positioning module 1236 may also conditionally select one or more tracking methods. For example, the viewer positioning module 1236 may use an image recognition tracking method under normal conditions, and then switch to an ultrasonic tracking method when the display system 1200 enters a night-vision mode. A skilled person will readily understand that the viewer positioning module 1236 may be better able to track the viewer's sightline under different modes and conditions by conditionally selecting the tracking method.

The image generator module 1232 may optionally load a simulation model from at least one simulation database for generating the stream of images. The simulation database may be stored on the storage module 1400, or remotely on another device on the network 1300. The instrument module 1250 may provide at least one physical interface element to the viewer of the display system 1200. The simulation computing module 1234 may be for managing a computer simulation in the display system 1200, the simulation computing module 1234 may further be for computing the simulation model from inputs obtained from the instrument module 1250 and a plurality of simulation parameters of the computer simulation.

The computer simulation may, for instance, be used for training purposes and/or for enacting a scenario from historical data (e.g. from an event recording device (e.g., a black box) from an aircraft, a train, etc.). The computer simulation may be scenario-based (e.g., where simulation code driving the simulated environment comprises one or more predetermined events, motions, sounds, etc.).

The computer simulation may be a vehicle computer simulation and a field of view for rendering the image may be defined from a user's position within a simulated vehicle. The present invention is not limited by the type of simulated vehicle, which may be terrestrial (car, tank, etc.), underground, airborne (e.g., an aircraft, a space shuttle), floating (e.g., a boat), etc. The field of view, or point of view, may be defined from the position of a trainee of the simulated vehicle (e.g., interacting with the simulation) and/or the position of an operator of the simulated vehicle (e.g., only determining content of the simulation code or participating to the simulation as well).

Figure 2:
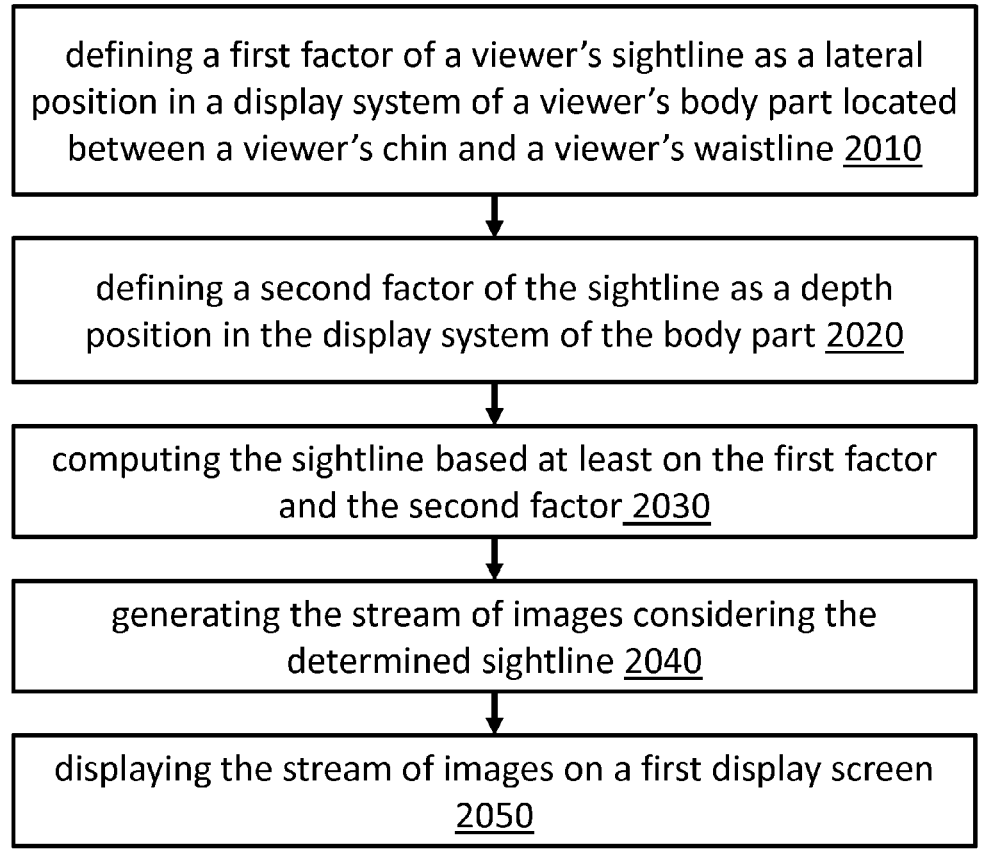
FIG. 2 is a flow chart of an exemplary method in accordance with the teachings of the present invention.

FIG. 2 shows a flow chart of an exemplary method 2000 for displaying a stream of images comprising in accordance with a first set of embodiments of the present invention. The method comprises defining 2010 a first factor of a viewer's sightline as a lateral position in a display system of a viewer's body part located between a viewer's chin and a viewer's waistline and defining 2020 a second factor of the sightline as a depth position in the display system of the body part. The method then follows with computing 2030 the sightline based at least on the first factor and the second factor and generating 2040 the stream of images considering the determined sightline before displaying 2050 the stream of images on a first display screen.

Generating 2040 the stream of images may further comprise generating a second stream of images thereby forming a stream of stereoscopic images. The method 2000 may then further comprise defining a third factor of the sightline as a viewer's eye-level height and horizontal rotational attitude. Computing 2030 the sightline may thus be further based on the first factor, the second factor and the third factor for ensuring correct generation of the stream of stereoscopic images.

Computing 2030 the sightline, in one embodiment, comprises dynamically determining the lateral position of the body part corresponding to the first factor and combining the lateral position with a static viewer's expected depth position of the viewer in the display system corresponding to the second factor. Computing 2030 the sightline, in another embodiment, comprises dynamically determining the lateral position of the body part corresponding to the first factor and the depth position of the body part corresponding to the second factor in the display system.

The method 2000 may further comprise, once the body part is determined to be moving, defining at least one of the first factor and the second factor of the sightline further using a predictive relative position factor of the body part.

Different steps may be taken to define the first factor and/or the second factor for the position of the viewer's body part. For instance, the first factor and/or the second factor may be defined by image recognition matching an expected outfit with a viewer's actual outfit; determining a reflector position of an infra-red or near-infra-red reflector on the body part, by determining a tracker position of a magnetic tracker on the body part, by using ultrasonic reflections, by determining a relative position between a seat of the display system and the body part and/or by determining a wearable device position of a wearable element of the display system worn on the body part.

The method 2000 may also further comprise loading a simulation model from at least one simulation database for generating the stream of images, providing at least one physical interface element to the viewer of the display system and managing a computer simulation in the display system by computing the simulation model from inputs obtained from the instrument module and a plurality of simulation parameters of the computer simulation.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for displaying a stream of stereoscopic images comprising:
    defining a first factor of a viewer's sightline as a lateral position in a display system of a viewer's body part located between a viewer's chin and a viewer's waistline;
    defining a second factor of the sightline as a depth position in the display system of the body part;
    defining a third factor of the sightline as a viewer's eye-level height and horizontal rotational attitude, wherein the viewer's eye-level height is calculated by applying a translation value to the position of the body part;
    computing the sightline based at least on the first factor, the second factor and the third factor;
    generating the stream of stereoscopic images, comprising a first stream of images and a second stream of images, considering the determined sightline; and
    displaying the stream of stereoscopic images on a first display screen.

2. The method of claim 1, wherein computing the sightline comprises:
    dynamically determining the lateral position of the body part corresponding to the first factor and combining the lateral position with a static viewer's expected depth position of the viewer in the display system corresponding to the second factor.

3. The method of claim 1, further comprising, once the body part is determined to be moving, defining at least one of the first factor and the second factor of the sightline further using a predictive relative position factor of the body part.

4. The method of claim 1, wherein at least one of the first factor and second factor for the position of the viewer's body part is defined by:
    image recognition matching an expected outfit with a viewer's actual outfit.

5. The method of claim 1, further comprising:
    loading a simulation model from at least one simulation database for generating the stream of images;
    providing at least one physical interface element to the viewer of the display system; and
    managing a computer simulation in the display system by computing the simulation model from inputs obtained from the at least one physical interface element and a plurality of simulation parameters of the computer simulation.

6. The method of claim 1, computing the sightline comprises:
    dynamically determining the lateral position of the body part corresponding to the first factor and the depth position of the body part corresponding to the second factor in the display system.

7. The method of claim 1, wherein at least one of the first factor and second factor for the position of the viewer's body part is defined by:
    determining a reflector position of an infra-red or near-infra-red reflector on the body part.

8. The method of claim 1, wherein at least one of the first factor and second factor for the position of the viewer's body part is defined by:
    determining a tracker position of a magnetic tracker on the body part.

9. The method of claim 1, wherein at least one of the first factor and second factor for the position of the viewer's body part is defined by:
    using ultrasonic reflections.

10. The method of claim 1, wherein at least one of the first factor and second factor for the position of the viewer's body part is defined by:
    determining a wearable device position of a wearable element of the display system worn on the body part.

11. The method of claim 1, wherein at least one of the first factor and second factor for the position of the viewer's body part is defined by:
    determining a relative position between a seat of the display system and the body part.

12. The method of claim 11, wherein the seat provides an array of position detector for determining the relative position.

* * * * *